June 2, 1970
A. CILIONE
3,515,329
CONTROL FOR FASTENER ATTACHING MACHINE
Filed Nov. 14, 1967
3 Sheets-Sheet 1
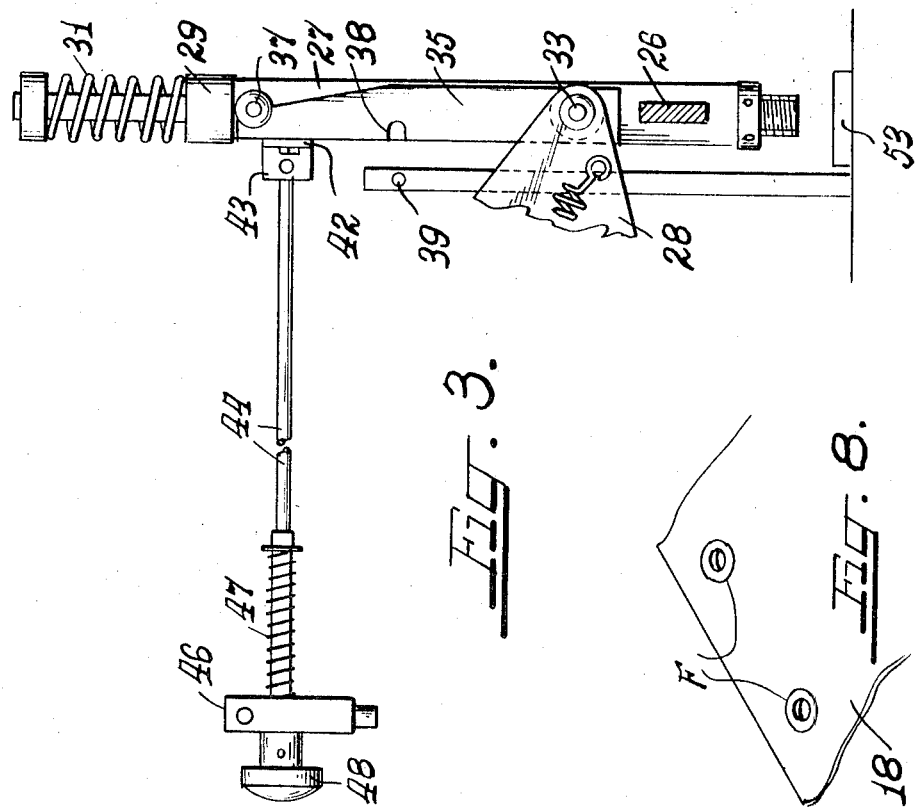
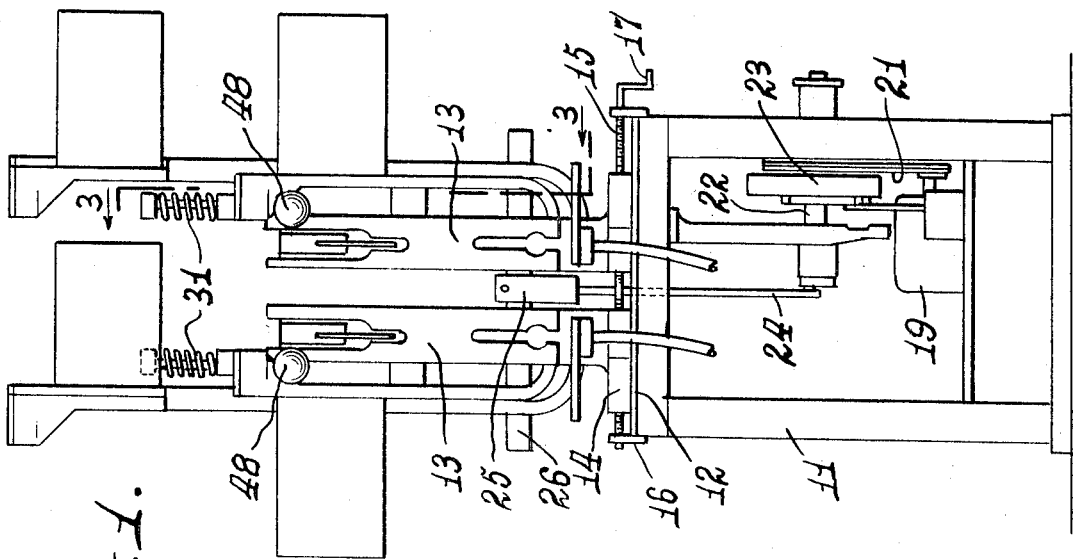
INVENTOR
Augustine Cilione
BY
Elmer L. Quichel
ATTORNEY INVENTOR
Augustine Cilione

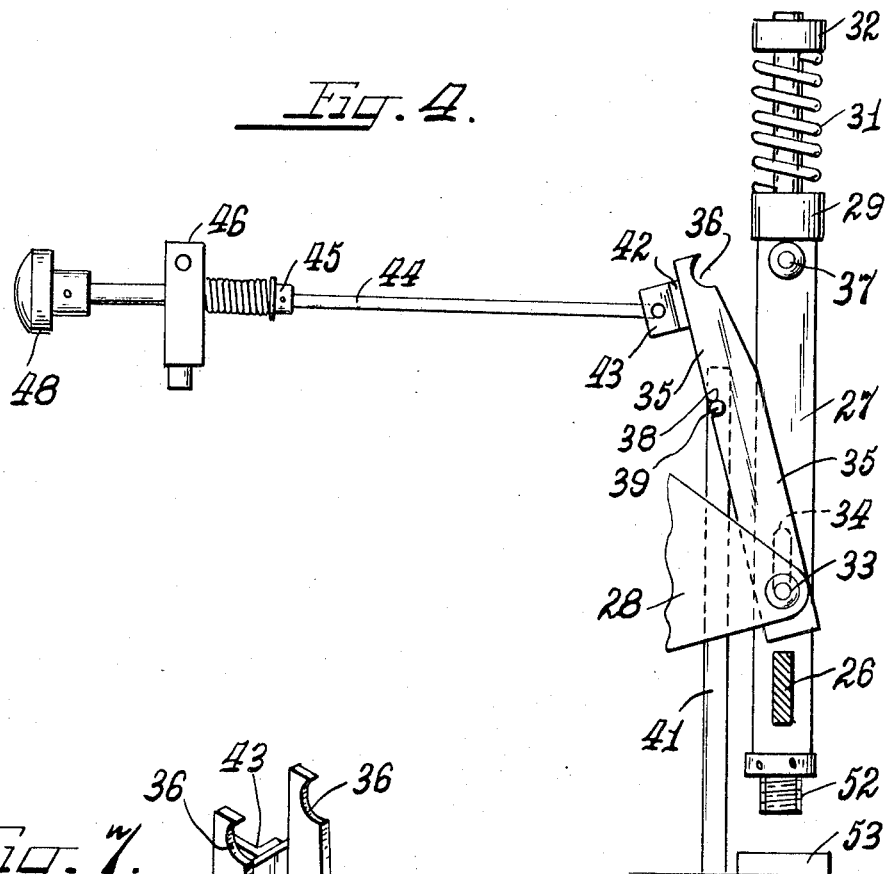
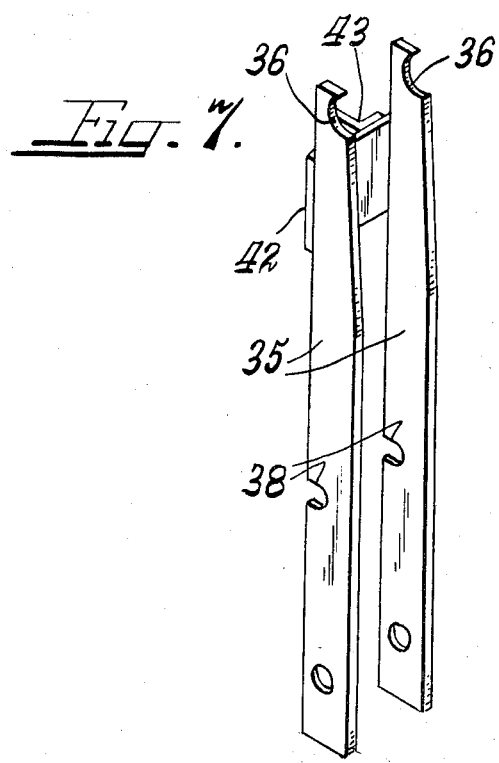
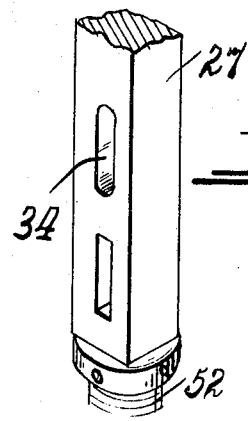

United States Patent Office 3,515,329
Patented June 2, 1970

3,515,329
CONTROL FOR FASTENER ATTACHING MACHINE
Augustine Cilione, North Providence, R.I., assignor to U.S. Industries, Inc. (doing business as Rau Fastener), Providence, R.I., a corporation of Delaware
Filed Nov. 14, 1967, Ser. No. 682,869
Int. Cl. B27f 7/22
U.S. Cl. 227—78                    10 Claims

ABSTRACT OF THE DISCLOSURE

A snap fastener component attaching machine having dual fastener attaching heads and selective means operable to control operation of either one or both of said attaching heads.

---

The invention is concerned with the provision of novel means under manual control of an operator for the selective control of the operation automatically of either one or both of a pair of fastener attaching heads on a machine for attaching snap fastener components and the like onto support sheets, garments, etc.

More particularly, the control means comprises readily accessible control rods associated one with each attaching head and independently manipulatable so as to selectively connect the operating mechanisms of either or both heads with a common drive assembly. Such structure is advantageous because in many instances of use it is desired to utilize but one of the dual attaching heads when but a single snap fastener component or the like is to be attached during each operating cycle. The drive assembly comprises common power operated reciprocable means operably connected with the actuating means on both of the attaching heads. Said actuating means includes reciprocable drive elements each embodying normally engaged connector means either one or both of which may be disengaged upon manipulation of its respective control rod. The assembly also includes novel means to insure balanced operation of the actuating means even though one of the heads is disconnected from the drive assembly.

It is therefore an object of the invention to provide an attaching machine of the character referred to.

Another object is to provide selective drive mechanisms for dual fastener attaching heads on such a machine.

Another object is to provide a dual head fastener attaching machine with novel drive connector assemblies.

Another object is to provide, in a dual head fastener attaching machine, novel means to effect selective automatic operation of either one or both heads.

Another object is to provide novel stabilizing means to prevent imbalance of the common drive means for a dual head fastener attaching machine when one of said heads is idle.

Another object is to provide control means in a machine of the character referred to which is not expensive or difficult to manufacture or to maintain serviceable and one that is very efficient in use.

The structure by means of which the above noted and other objects and advantages of the invention are attained will be described in the following specification, taken in conjunction with the accompanying drawings, showing a preferred illustrative embodiment of the invention, in which:

FIG. 1 is a front elevational view of a fastener attaching machine having a pair of fastener attaching heads.

FIG. 3 is a side elevational view of one of the reciprocable drive elements, viewed substantially along line 3—3 of FIG. 1, omitting the attaching head assembly.

FIG. 4 is a view similar to FIG. 3, showing the drive element disconnected.

FIG. 6 is a fragmentary perspective view of the connector link.

FIG. 7 is a perspective view of the stop plate assembly.

FIG. 8 is a fragmentary perspective view of a support sheet having two fastener members attached thereto.

Figure 2:
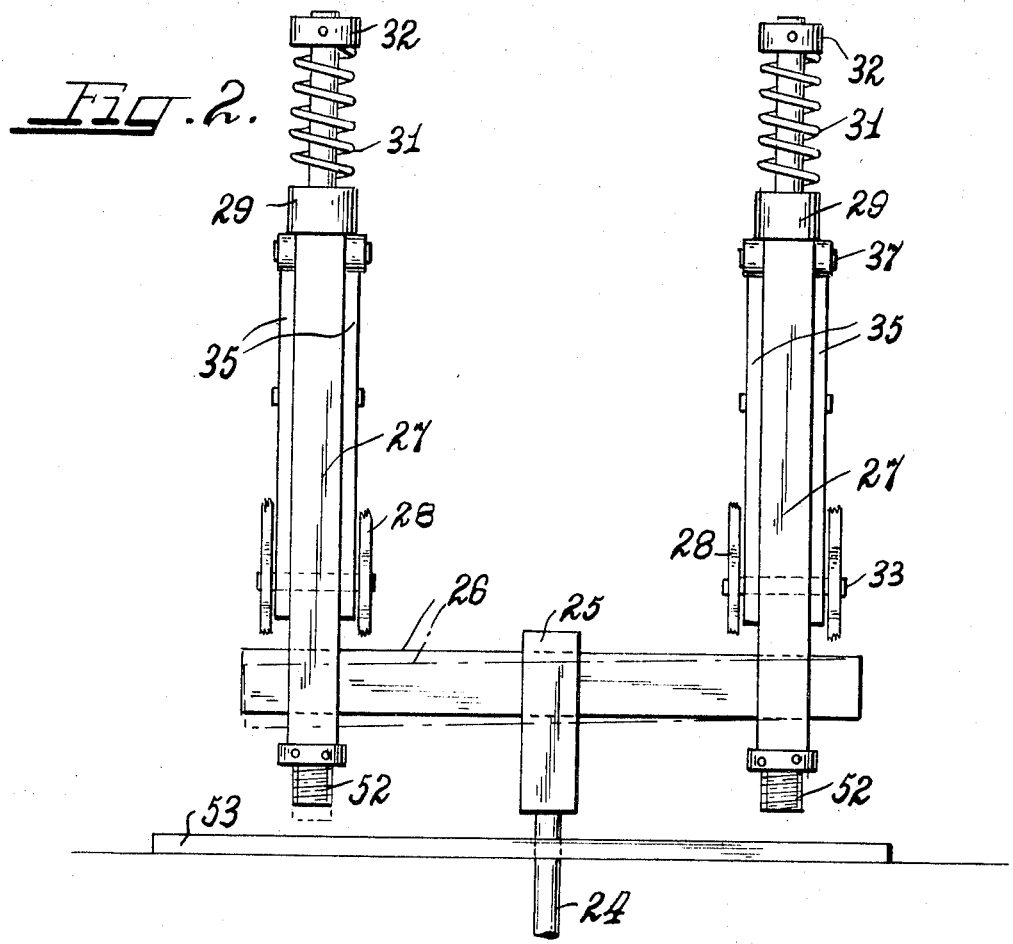
FIG. 2 is a rear elevational view of the novel reciprocable drive elements.

A dual head fastener attaching machine of this general character is shown in copending application Ser. No. 548,344, filed Apr. 8, 1966, now abandoned.

Referring to the exemplary disclosure of the fastener attaching machine embodying the features of this invention, as best shown in FIG. 1 of the accompanying drawings, the machine includes a hollow frame structure 11 including a top surface 12 having suitable guides thereon in which is mounted a pair of fastener component attaching heads 13. These heads are arranged side by side and they are substantially alike and each includes a base 14 which is seated on the top surface 12 of the frame structure. These heads are mounted for selective adjustment towards and away from each other. Controlled movement of the heads 13 toward and away from each other in unison may be accomplished by a screw 15 common to the base of each head and which is journalled on the frame structure at 16. It should be evident that upon manual rotation of screw 15, by means of a crank 17 thereon, the heads may be shifted longitudinally toward and away from each other in unison. This adjustment is required to vary the spacing between fastener components F (FIG. 8) attached thereby to a support sheet or garment 18.

Still referring to FIG. 1, power for operating the pair of heads 13 in unison is obtained from a motor 19 carried within frame structure 11. As shown, the motor has a chain drive connection 21 with a shaft 22 mounting a trip-clutch 23 that is operably connected with a substantially vertically upwardly extending drive connecting rod 24. The rod 24 is located in the area of the longitudinal center of the machine rearwardly of heads 13. It carries firmly on its upper end (FIG. 2) a bifurcated fixture 25 that has extending through it a cross bar 26 that projects laterally on each side thereof. Each lateral extension of said bar 26 mounts for free sliding therealong, a connecting link 27 which links are operably connected one with the head tripping mechanism, generally indicated at 28 (FIG. 3) in each attaching head in a manner to be described presently. These connector links 27 extend upwardly a considerable distance and each projects through a fixed guide 29 on the respective head. Coil springs 31, one carried on the upper end of each link 27, are seated on the respective guides 29 and are each restrained by collars 32 one secured to the end of each link 27. Thus it will be noted that the connector links normally are held elevated and are drawn downwardly by the operating drive mechanism in a manner to compress said springs 31 which function to return the links to their elevated position when permitted by said mechanism.

The specific construction and operation of each connector link connection with a head assembly 13 is identical and only one will be described in detail with like numbers identifying corresponding parts of each.

As best shown in FIGS. 2, 3 and 4, the connector link 27 carries a lateral journal pin 33 which is extending loosely through a vertical slot 34 in said link. This pin mounts, pivotally, on its ends a pair of stop plates 35 that normally overlie the side faces of the link and terminate at their upper ends in notches 36 that normally engage with the projecting ends of a stop pin 37 carried firmly adjacent the upper end of link 27. The journal pin 33 also is connected to a head tripping linkage or element 28 that constitutes part of the head mechanism for actuating the usual fastener component setting plunger therein. It should be apparent at this time that when the stop plates 35 are in the pin engaging position shown in FIG. 3, any vertical reciprocation of the connector link 27 will impart actuation to the head mechanism. Because the head mechanism is conventional and forms no part of this invention it is not disclosed or described in detail.

When it is desired to render either one of the heads inoperative, as may be required when but a single fastener component is to be attached to a sheet, the stop plates 35 of the head assembly to be disconnected from the drive are moved into a position to disengage their notches 36 from stop pin 37. This disengaged position is best shown in FIG. 4, where it will be observed that notch shoulders 38 in said stop plates are now engaged with immovable pins 39 carried on a rigid stop plate or support 41. This engagement locks the stop plates 35 in their elevated position and the connector link is now free to reciprocate without head operation, the lateral journal pin 33 riding freely in slot 34.

Figure 5:
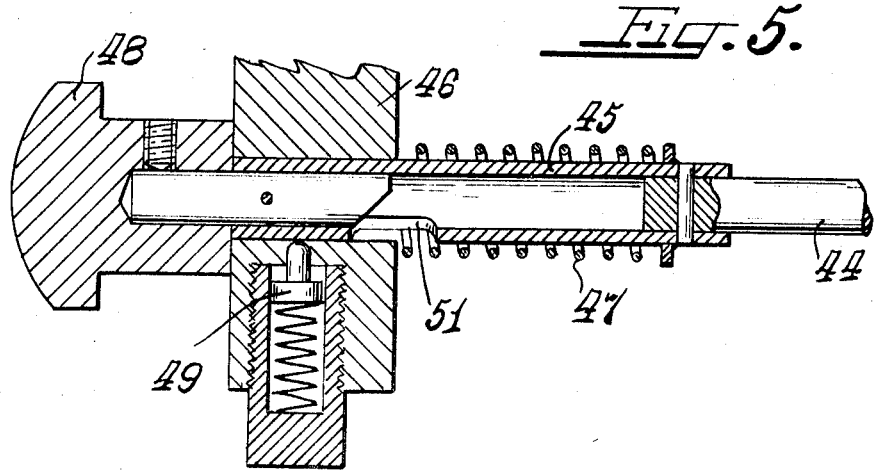
FIG. 5 is an enlarged axial sectional view of the control rod and knob assembly.

Movement of the stop plates 35 into engaged and disengaged positions is accomplished from the front side of the machine. As best shown in FIG. 7, the stop plates 35 are rigidly connected together by a bridge plate 42 that has an apertured ear 43 extending from one face. A rod 44 is connected to said ear, as shown, and it extends forwardly toward the front of the head and carries on its forward end, rigidly, a tubular extension 45 (FIG. 5) that projects through a pivotally mounted block 46. A spring 47 normally urges the rod assembly rearwardly to engage the stop plate notch 36 with the stop pin 37. A knob 48 carried on the free end of the rod assembly is manually engageable for pulling said rod forwardly to disengage the stop plates. When pulled forwardly a spring detent 49, carried in the block 46, will engage in a recess 51 in the rod assembly to resist its return movement. Thus the rod assembly must be forcibly released from spring detent 49 so as to be urged by spring 47 into stop plate engaged position.

In order to avoid an imbalance in the cross bar 26 when but one of the heads is operably connected with the drive, each connector link 27 carries on its bottom end a stabilizing screw 52 (FIG. 2). These screws normally substantially abut a plate 53 on the frame in unison when both connector links reach their lowermost positions. When one of the head assemblies is disconnected, the related connector link 27, being free of drag, will tend to advance downwardly more rapidly than the other carrying a load. This imparts a slight twist or rocking in a vertical plane of the cross bar 26 in its mounting in the drive rod fixture 25. Such repositioning is indicated in broken lines in FIG. 2. As a result, the stabilizing screw 52 on the free connector link 27 will strike the plate 53 and cause the cross bar 26 to straighten out so as to afford full downward motion of the other connecting link 27 and thus insure total actuation of the connected head mechanism.

In operation, with the stop plates 35 engaged with the respective stop pins 37, vertical reciprocation of the connector link 27 is transmitted to the head tripping mechanism 28. The stop plates 35 will remain in engagement with stop pins 37 so long as the rod 44 is not withdrawn, the mounting 46 rocking sufficiently to prevent such disengagement which is maintained by spring 47.

When either one of said stop plates 35 is disengaged from its respective stop pin 37, the related connector link 27 reciprocates idly, it being disconnected from the related head tripping mechanism 28 which is held against movement by the engagement of notch 38 in plate 35 with stop pin 39.

Although a preferred embodiment of the invention has been described in considerable detail it will be understood that the description thereof is intended to be illustrative, rather than restrictive, as details of he sructure may be modified or changed without departing from the spirit or scope of the invention. Accordingly it is not desired to be restricted to the exact construction described.

I claim:

1. A fastener attaching machine of the type having a pair of fastener attaching heads and mechanism in each head operable to attach fastener components to a support sheet, comprising, a frame, said attaching heads being adjustable on said frame towards and away from each other, common drive means for said mechanism, a pair of drive connector assemblies one connecting said common drive means to each mechanism, said drive connector assemblies being adjustable with the attaching heads, and manual control means on each assembly selectively operable to render a selected drive connector assembly inoperative.

2. The machine recited in claim 1, in which each drive connector assembly includes clutch means.

3. The machine recited in claim 1, in which each drive connector assembly includes a reciprocable element and latch means connecting said reciprocable element to the mechanism.

4. The machine recited in claim 1, in which the common drive means comprises a reciprocable rod having a cross-head, and the drive connector assemblies are connected to the cross-head.

5. The machine recited in claim 4, in which the drive connector assemblies are adjustable along said cross-head.

6. The machine recited in claim 4, in which stabilizing means is carried on the drive connector assemblies to limit imbalance in the cross-head when one of said assemblies is inoperative.

7. The machine recited in claim 1, in which the drive connector assemblies are located at the back of the respective attaching heads and the manual control means extends to the front of the respective attaching heads.

8. The machine recited in claim 1, in which the manual control means comprises a reciprocable element and means engageable therewith to restrain its free reciprocation.

9. The machine recited in claim 1, in which the drive connector assemblies each comprise a reciprocable element having a stop pin thereon, and movable means connected to the mechanism and disengageably associated with said stop pin.

10. The machine recited in claim 9, in which the movable means comprises a lever connected firmly to the mechanism and engageable with the stop pin.

References Cited

UNITED STATES PATENTS 1,021,869   4/1912   Havener _____ 227—78 XR

GRANVILLE Y. CUSTER, Jr., Primary Examiner

U.S. Cl. X.R.

227—109